United States Patent
Werner et al.

(10) Patent No.: US 7,215,847 B2
(45) Date of Patent: May 8, 2007

(54) METHOD AND APPARATUS FOR MITIGATION OF MODAL DISPERSION EFFECTS IN MULTIMODE FIBER

(75) Inventors: Walter V. Werner, Pittsford, NY (US); Kerry D. Laviolette, Liverpool, NY (US)

(73) Assignee: Lockheed Martin Corporation, Syracuse, NY (US)

( * ) Notice: Subject to any disclaimer, the term of this patent is extended or adjusted under 35 U.S.C. 154(b) by 0 days.

(21) Appl. No.: 11/069,605

(22) Filed: Mar. 1, 2005

(65) Prior Publication Data

US 2006/0093260 A1 May 4, 2006

Related U.S. Application Data

(60) Provisional application No. 60/623,671, filed on Oct. 29, 2004.

(51) Int. Cl.
*G02B 6/26* (2006.01)
(52) U.S. Cl. ........................................................ 385/31
(58) Field of Classification Search .................. 385/15, 385/24, 27, 31, 38
See application file for complete search history.

(56) References Cited

U.S. PATENT DOCUMENTS

| | | | |
|---|---|---|---|
| 4,852,973 A | 8/1989 | Durnin et al. | |
| 4,887,885 A | 12/1989 | Durnin et al. | |
| 5,245,619 A | 9/1993 | Kronberg | |
| 5,336,875 A | 8/1994 | Ono et al. | |
| 5,349,592 A | 9/1994 | Ando | |
| 5,497,359 A | 3/1996 | Mamin et al. | |
| 6,510,265 B1 * | 1/2003 | Giaretta et al. | ............... 385/38 |
| 6,552,864 B1 | 4/2003 | Ruschin | |
| 6,556,329 B1 * | 4/2003 | Simcoe et al. | ............. 398/194 |

OTHER PUBLICATIONS

"Equalization of Modal Dispersion in Multimode Fiber using Spatial Light Modulators" Alon et al, Dept of Elec Eng of Stanford Univ., 7 pages, no date.

* cited by examiner

*Primary Examiner*—Sarah Song
(74) *Attorney, Agent, or Firm*—George R. McGuire; William Greener; Bond, Schoeneck & King, PLLC

(57) ABSTRACT

A method for mitigating modal dispersion in a multimode optical fiber involves launching a diffractionless optical beam, such as a Bessel beam, into a multimode optical fiber. A fiber optical transmission system includes a multimode optical fiber transmission medium having an input end and an output end, an optical signal transmitter in communication with the input end of the multimode optical fiber medium, means for converting the optical signal into a diffractionless optical signal, means for launching the diffractionless optical signal in the input end of the multimode optical fiber transmission medium, means for outputting the propagated optical signal from an output end of the multimode fiber transmission medium, and a receiver that receives the optical signal from the output means. Fiber optic communication systems employing the invention embodiments include point-to-point transmission links, local area networks and WDM systems including coarse wavelength division multiplexing and dense wavelength division multiplexing systems.

23 Claims, 3 Drawing Sheets

METHOD AND APPARATUS FOR MITIGATION OF MODAL DISPERSION EFFECTS IN MULTIMODE FIBER

RELATED APPLICATION DATA

This application is related to U.S. provisional application Ser. No. 60/623,671 filed on Oct. 29, 2004 and incorporated herein by reference in its entirety, and claims the benefit of priority thereto under 35 USC §119(e).

BACKGROUND OF THE INVENTION

1. Field of the Invention

Embodiments of the invention are generally directed to the field of fiber optic communication and more particularly to a method and apparatus for mitigating the effects of modal dispersion in multimode optical fiber and fiber optic communication systems incorporating these methods and apparatus.

2. Description of Related Art

It is known to propagate optical communication signals over the medium known as optical fiber. The most general types of optical fiber are referred to as single mode fiber and multimode fiber. Optical fiber generally consists of two parts: a core region and a cladding region surrounding the core region. The core region and the cladding region have different optical characteristics, most notably the core region has an index of refraction, $n_1$, that is greater than the index of refraction, $n_2$, of the cladding region. A single mode fiber typically has an outer diameter of approximately 125 microns and a core diameter on the order of 2–10 microns. In contrast, a multimode glass fiber having an outer diameter of approximately 125 microns may typically have a core region diameter on the order of 50–65 microns (50 and 62.5µ being typical multimode core diameter values). The difference between the optical characteristics of the core region and the cladding region allow light to be guided in the core region of the fiber and substantially confined to the core region without leaking into the cladding region.

In consideration of factors including fiber geometry and optical parameters such as index of refraction, various conditions are established that control the characteristics of the light propagating along the fiber. These characteristics are referred to as fiber modes. A mode can basically be thought of as a self-repeating intensity distribution. An acoustic mode, for example, is well illustrated by the standing wave pattern of a guitar string at a particular frequency or sound. Different frequencies (different sounds) produce different patterns of string vibration that represent different modes of the sound waves. Similarly, in the optical realm, light of different colors is defined by the wavelength (or frequency) of the light. Other discernable characteristics of light wave transmission are its polarization and the strength of the electric and magnetic fields of the light. These characteristics define the various possible patterns of the light referred to as modes. Illustrations of several transverse Gaussian laser mode patterns having cylindrical symmetry ($TEM_{pl}$) are shown in FIGS. 1(a–l), where p, l are integers labeling the radial and angular mode order. Similar transverse Gaussian laser mode patterns having rectangular symmetry ($TEM_{mn}$) are shown in FIGS. 2(a–l), where m, n are integers representing the horizontal and vertical mode orders. The lowest order mode, denoted as the (0,0) mode in FIGS. 1a, 2a, resembles a substantially uniform intensity circle of light. FIG. 2b illustrates a (1,0) mode that is characterized by a vertical division creating two lobes as shown. FIGS. 1(a–l) and 2(a–l) show mode patterns having various (p,l) and (m,n) values as shown.

As their names indicate, a single mode optical fiber restricts the propagation of light modes along the fiber to a single mode. This is typically the (0,0) mode as it is the most stable. In a similar manner, a multimode fiber supports the simultaneous propagation of multiple modes.

For reasons well known in the art, the various modes propagating in a length of multimode fiber travel along the fiber at different velocities. The different velocities of these modes gives rise to the phenomenon of dispersion. Dispersion, in optical terms, refers to the spreading or separation of a wave into different spectral components as seen, for example, by the effects of a prism on white light. In a waveguide, such as a multi-mode optical fiber, the dispersion of the modal patterns of light in the fiber is referred to as modal dispersion, (sometimes referred to as multimode distortion). Modal dispersion is the temporal spreading (distortion) of the optical signal (light pulses) due to the different propagation velocities of the different modes. This temporal pulse distortion, or modal dispersion, results in what is known as intersymbol interference (ISI) at the receiver or signal detector. A diagram of ISI is illustrated in FIG. 3 and can be understood as follows: In optical fiber communications, the signal information is coded into trains of optical pulses. These information pulses, contained in the propagating modes, arrive at a distant end point (e.g., receiver) of the system at different times due to the effect of modal dispersion; i.e., an original pulse of data at the input end of the fiber spreads apart into several pulses at the receiver end of the fiber. Intersymbol interference caused by the modal dispersion is the principal limiting factor affecting what is known as the bit rate-distance product of the fiber communication system. The bit rate-distance product is a metric that measures the information capacity of the optical fiber. It is well known that the ISI at the receiver is a direct function of the modes that are excited or launched at the input end of the fiber. For example, strongly focused light at the input will excite a large number of modes due to the strong convergence angle of the light. Each mode will travel with a group (envelope) velocity, $(v_g)_{m,n}$. If all the modes from (0,0) to $(m_{max}, n_{max})$ are excited, the output pulse at a distance, z=L, will broaden to a value expressible as $$\Delta\tau \approx L[(1/(v_g)_{m\ max,\ n\ max}) - (1/(v_g)_{0,0})].$$

It can be shown that the maximum number of pulses per second that can be transmitted without serious overlap of adjacent output pulses is $$f_{max} \sim 1/\Delta\tau.$$

Thus, high data rate transmission is maximized by single mode excitation, and single mode propagation through single mode optical fiber. (See, Yariv, *Introduction to Optical Electronics*, Second Edition, Holt, Reinhart & Winston, NY, Cha. 3 (1976)), incorporated herein in its entirety to the fullest allowable extent. However, many of the existing legacy fiber installations found, for example, on ships, in aircraft and throughout local area networks consist of multimode, premises optical fiber that cannot be replaced by single mode fiber in a cost effective manner. Accordingly, solutions are required that cost effectively improve the bit rate-distance product capacity of these multimode installations.

Several techniques have been developed and deployed to control the modes that are excited and launched in multimode optical fiber. One technique relies on the use of spatial light modulators to perform adaptive spatial filtering such that only the desired modes are excited. The interested reader is directed to Alon et al., EQUALIZATION OF MODAL DISPERSION IN MULTIMODE FIBER USING SPATIAL LIGHT MODULATORS, Department of Electrical Engineering, Stanford University, CA 94305, the subject matter of which is herein incorporated by reference in its entirety to the fullest allowable extent. Alternatively, a technique known as radial offset launch has been demonstrated to selectively launch advantageous modes. In this side launch technique, the input light to the system is launched off-center and off-angle with respect to the core of the multimode fiber. However, both of the above mentioned techniques for mitigating modal dispersion in multimode fiber and reducing the resulting degradation of the bit rate-distance product due to ISI are costly and technically complex.

Accordingly, the inventors have recognized a need for a more cost-effective, less complex approach to the mitigation of modal dispersion in multimode fiber that additionally is less sensitive to radial fiber perturbations, and thus more immune to modal dispersion induced ISI. Further, an approach is sought that will be less impacted by the defect-ridden core of many legacy multimode fibers, which mitigates the effects of deterministic jitter by mode launch conditions coupled with modal dispersion within the fiber, and which provides other benefits and advantages over currently known solutions as will be recognized by those skilled in the art.

SUMMARY OF THE INVENTION

An embodiment of the invention is directed to a method for mitigating modal dispersion in a multimode optical fiber. The method generally comprises launching a zero-order and/or higher order Bessel beam into an input of an optical fiber, whereby the effects of modal dispersion and the resulting phenomenon of intersymbol interference are reduced. It is known that a Bessel beam is a realizable form of a diffractionless electromagnetic intensity distribution propagating in a free-space medium. Various means are well known in the art by which to passively create a Bessel beam. They include, for example, the use of annular apertures, axicons, lens systems having spherical aberration, and others. US patents to Durnin et al. U.S. Pat. Nos. 4,852,973 and 4,887,885; Ando U.S. Pat. No. 5,349,592; and Ruschin U.S. Pat. No. 6,552,864 are hereby incorporated by reference in their entireties to the fullest allowable extent for descriptions and explanations relating to Bessel beam creation.

According to another embodiment, a fiber optical transmission system comprises a multimode optical fiber transmission medium having an input end and an output end, an optical signal transmitter in communication with the input end of the multimode optical fiber medium, means for converting the optical signal into a diffractionless optical signal, means for launching the diffractionless optical signal in the input end of the multimode optical fiber transmission medium, means for outputting the propagated optical signal from an output end of the multimode fiber transmission medium, and a receiver that receives the optical signal from the output means.

Another embodiment of the invention is directed to a fiber optic telecommunications system. In various aspects, the system may be a point-to-point transmission link, a local area network, or a WDM systems including coarse wavelength division multiplexing or dense wavelength division multiplexing systems.

The foregoing and other objects, features, and advantages of embodiments of the present invention will be apparent from the following detailed description of the preferred embodiments, which makes reference to several drawing figures.

DETAILED DESCRIPTION OF A PREFERRED EMBODIMENT OF THE INVENTION

A method for mitigating modal dispersion of an optical signal in a multimode optical fiber transmission medium involves the steps of providing an optical signal, transforming the optical signal into a form characterized as a Bessel beam, launching the Bessel beam signal into an input end of a multimode optical fiber transmission medium, outputting the optical signal at an output end of the multimode optical fiber transmission medium and receiving the output signal at a receiving station of the transmission system. The diffractionless nature of Bessel beam propagation allows the launch or excitation of signal transmission modes in the multi-mode optical fiber that are less prone to temporal spreading, known in the art as modal dispersion, which results in intersymbol interference at a detector or receiver in the system, and which limits the bit rate-distance product capacity of the system. Embodiments of the invention are applicable to all common fiber optical communication transmission windows including the established low loss windows at 800 nm, 1310 nm and 1550 nm.

Figure 1:
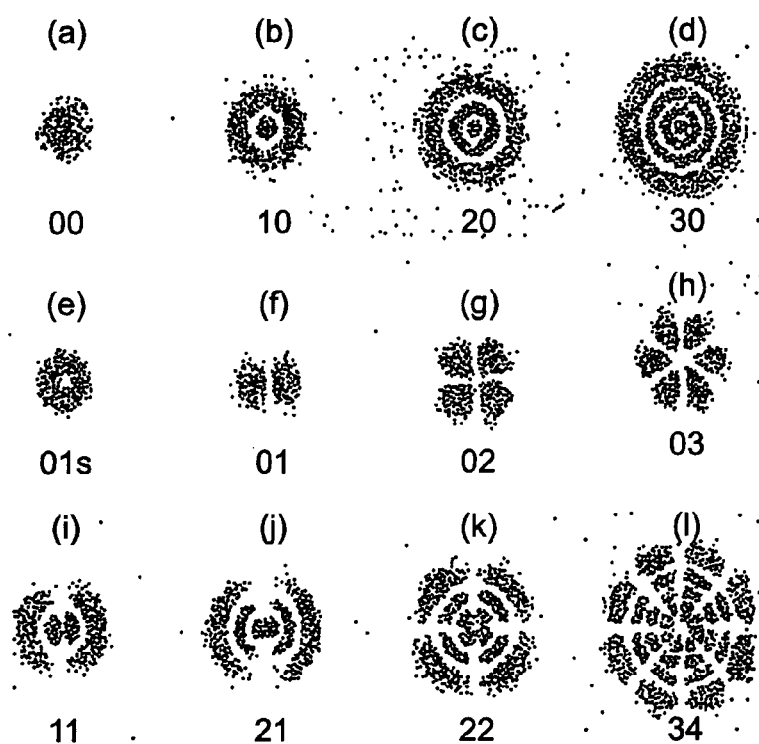
FIGS. 1a–1l are illustrations of several $TEM_{pl}$ Gaussian beam modes having cylindrical symmetry for different (p, l) values as shown.
Figure 2:
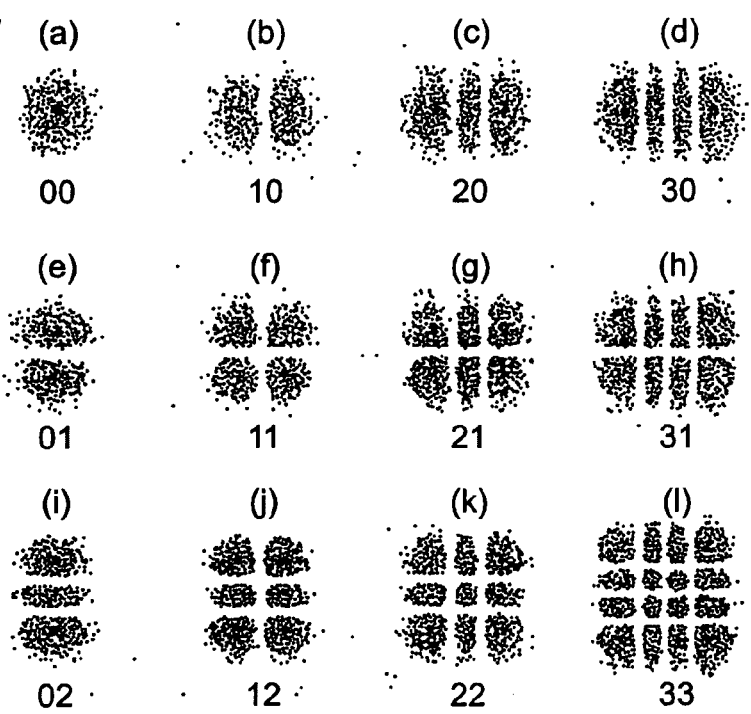
FIGS. 2a–2l are illustrations of several $TEM_{mn}$ Gaussian beam modes having rectangular symmetry for different (m, n) values as shown.
Figure 3:
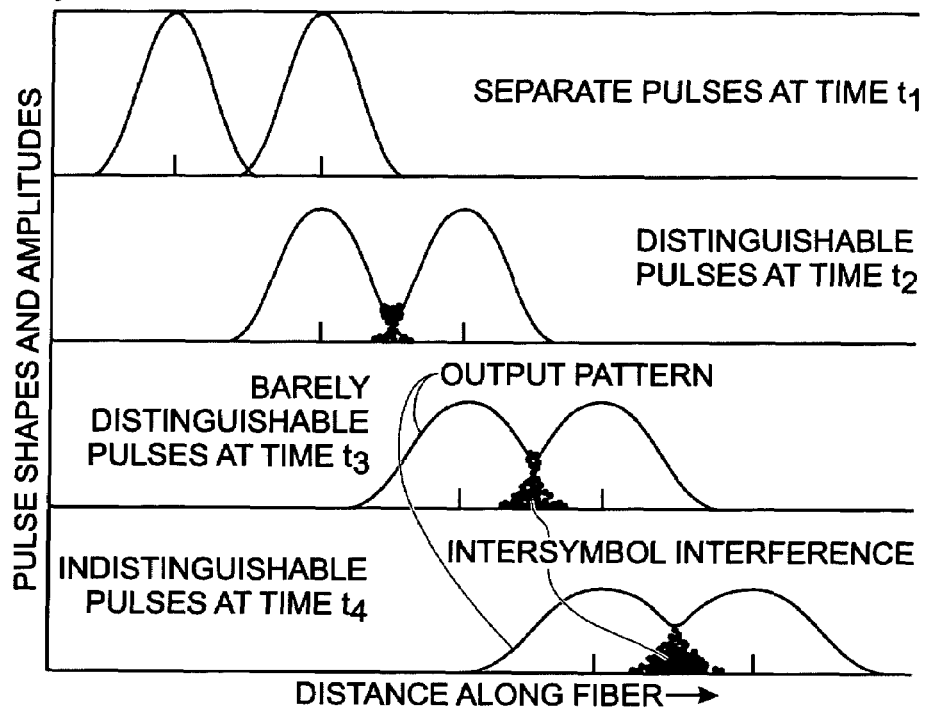
FIG. 3 is a graphical schematic illustrating modal dispersion and resulting intersymbol interference.
Figure 4:
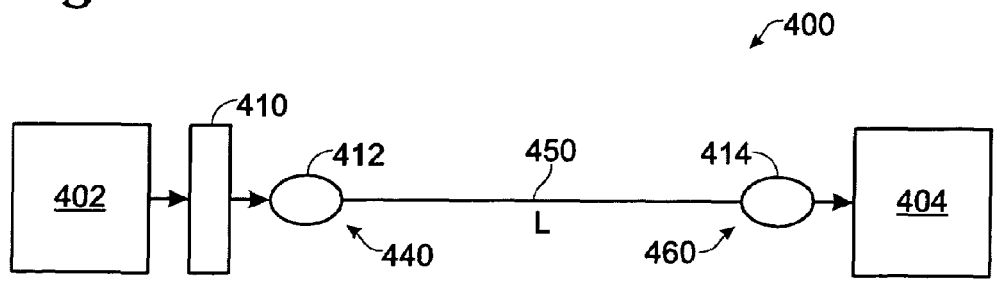
FIG. 4 is a block diagram of a fiber optical transmission system according to an illustrative embodiment of the invention.

A transmission system 400 as shown in FIG. 4 is illustrative of the method embodiment described above. The system 400 includes a multimode optical fiber transmission medium 450 having a receiving or input end 440 and a transmitting or output end 460 separated by a fiber length, L. The transmission medium may be a premises fiber or fiber optic cable with fiber core diameters of 50 or 62.5μ. An optical signal transmitter component 402 is located in connection with the input end 440 of the fiber transmission medium 450. A receiving/detecting unit 404 is suitably located to receive an output signal from the output end 460 of the optical fiber transmission medium. A Bessel beam generator 410 is positioned intermediate the transmitter component 402 and the input end 440 of the multimode optical fiber 450 for converting the optical transmission signal from the transmitter 402 into a diffractionless-type Bessel beam signal, which is then launched into the optical fiber via input component 412. An output component 414 is similarly positioned intermediate the output end 460 of the multi-mode optical fiber and the receiving component 404.

The transmitter component 402, receiver unit 404, input component 412, output component 414 and multi-mode optical fiber medium 450, as well as other components and/or assemblies used in fiber optic communication systems are well known in the art. The reader is referred to Agrawal, *Fiber-Optic Communication Systems*, Second Edition, John Wiley & Sons, NY (1997), the contents of which are herein incorporated by reference in their entirety to the fullest allowable extent.

Figure 5:
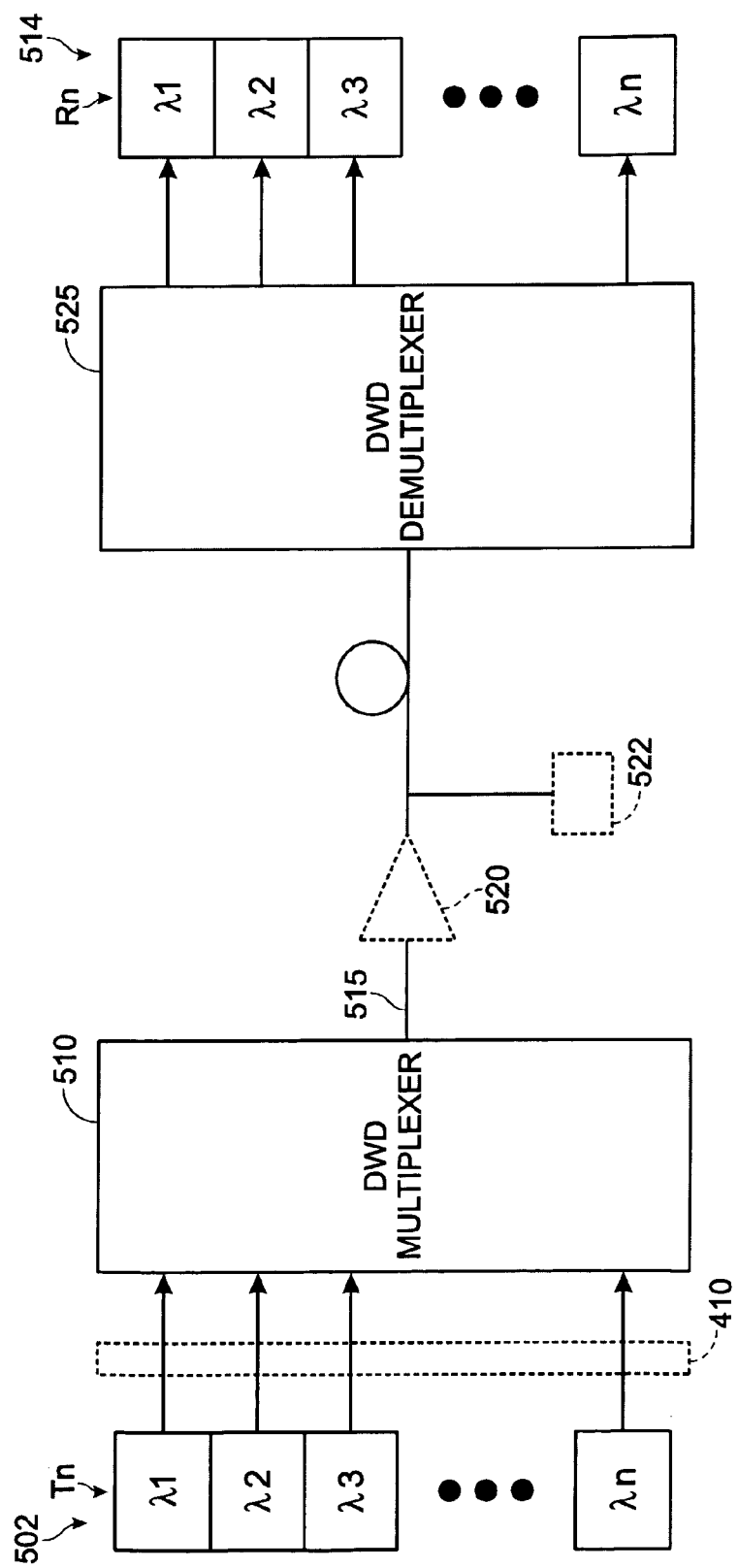
FIG. 5 is a block diagram illustrating a dense wavelength division multiplexing (DWDM) fiber optic communication system according to an exemplary embodiment of the invention.

An exemplary fiber optic communication system 500 in the form of a dense wavelength division multiplexing (DWDM) system is illustrated in FIG. 5. Typically, DWDM refers to a wavelength division multiplexing (WDM) system in which eight or more active wavelength signals are transmitted. A coarse wavelength division multiplexing (CWDM) system as that term is used herein refers to a WDM system in which less than eight active wavelength signals are transmitted. The system includes signal transmitters (502) $T_1, T_2, \ldots T_n$ each generating a corresponding signal wavelength $\lambda_1, \lambda_2, \ldots \lambda_n$. A Bessel beam generator 410 converts the signals into diffractionless-type signals as described above. A dense wavelength division multiplexer 510 of various known designs combines the wavelength signals, which are input to multimode premises fiber 515. An optical amplifier 520 as is known in the art may be a system component if signal amplification is necessary. Various other photonic components 522 such as add/drop multiplexers, optical circulators, wavelength filters, fiber optic couplers, wavelength splitters and others known in the art may be system components as required by system design. The multiplexed signals are demultiplexed by a dense wavelength division demultiplexer 525 and sent to signal receivers (514) $R_1, R_2, \ldots R_n$. It will be appreciated that the communication system may be a local area network, a point-to-point transmission link or otherwise designed system as well as a CWDM or DWDM system.

The foregoing description of the embodiments of the invention have been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A method for propagating an optical signal in an optical fiber, comprising:
   providing a length of multimode optical fiber having an input and an output;
   providing an optical signal transmitter for generating an optical signal;
   inputting the optical signal into a diffractionless optical beam generator for converting the optical signal into a diffractionless optical signal for optical fiber propagation;
   launching the diffractionless optical signal into the input of the multimode optical fiber;
   transmitting the diffractionless optical signal along the length of the multimode optical fiber; and
   receiving the optical signal at the output of the multimode optical fiber.

2. The method of claim 1, wherein inputting the optical signal into a diffractionless optical beam generator for converting the optical signal into a diffractionless optical signal comprises providing a Bessel beam generator and converting the optical signal into at least one of a zero-order Bessel beam, a higher order Bessel beam, and a combination thereof.

3. The method of claim 1, wherein launching the diffractionless optical signal into the input of the multimode optical fiber comprises providing means for launching the diffractionless optical signal in the input of the multimode optical fiber.

4. The method of claim 1, further comprising providing means for outputting the propagated optical signal from the output of the multimode optical fiber.

5. The method of claim 4, wherein receiving the optical signal at the output of the multimode optical fiber comprises receiving a signal having less of a modal dispersion characteristic than if the received signal was not in the form of a diffractionless optical signal.

6. The method of claim 1, wherein generating an optical signal comprises providing an optical signal in a fiber optical communication transmission window at at least one of 800 nm, 1310 nm and 1550 nm.

7. The method of claim 1, comprising launching the diffractionless optical signal into the input of the multimode optical fiber on-axis.

8. A method for mitigating modal dispersion of an optical signal propagated in a multimode optical fiber transmission medium, comprising:
   providing an optical signal;
   transforming the optical signal into a form characterized as a Bessel beam;
   launching the Bessel beam signal into an input of a multimode optical fiber transmission medium;
   outputting the optical signal at an output of the multimode optical fiber transmission medium; and
   receiving the output signal at a receiving station of the transmission system.

9. The method of claim 8, comprising transforming the optical signal into a form characterized as at least one of a zero-order Bessel beam, a higher order Bessel beam, and a combination thereof.

10. The method of claim 8, comprising providing an optical signal in a fiber optical communication transmission window at at least one of 800 nm, 1310 nm and 1550 nm.

11. The method of claim 8, comprising launching the Bessel beam signal into the input of the multimode optical fiber transmission medium on-axis with respect to the fiber transmission medium.

12. A fiber optic communication system, comprising:
   a multimode optical fiber transmission medium having an input end and an output end separated by a fiber length, L;
   an optical signal transmitter disposed in optical connection with the input end of the fiber transmission medium;
   a detector disposed in optical connection with the output end of the fiber transmission medium to receive an output signal from the optical fiber transmission medium;
   a diffractionless beam generator disposed optically intermediate the optical signal transmitter and the input end of the multimode optical fiber that can convert the optical transmission signal from the transmitter into a diffractionless-type beam signal;
   an input component disposed in optical connection with the input end of the multimode optical fiber transmission medium and adapted to launch the diffractionless-type beam signal into the input end; and an output component disposed in optical connection with the output end of the multimode optical fiber transmission medium and adapted to transfer the output signal to the detector.

13. The system of claim 12, wherein the diffractionless beam generator is a Bessel beam generator that is adapted to provide at least one of a zero-order and a higher order Bessel beam.

14. The system of claim 12, wherein the optical signal transmitter is adapted to provide an optical signal in a fiber optical communication transmission window at at least one of 800 nm, 1310 nm and 1550 nm.

15. The system of claim 12, being characterized by a bit rate-distance product that is greater than the bit rate-distance product of a correspondingly similar fiber optic communication system that does not transmit a diffractionless-type beam signal.

16. The system of claim 12, wherein the output signal has an intersymbol interference component that is less than an intersymbol interference component of a non-diffractionless-type output signal at the detector.

17. The system of claim 12, wherein the multimode optical fiber transmission medium is a premises fiber or fiber cable.

18. The system of claim 12, comprising a local area network.

19. The system of claim 12, comprising a point-to-point transmission link.

20. The system of claim 12, comprising a wavelength division multiplex (WDM) system.

21. The system of claim 20, comprising a dense wavelength division multiplex (DWDM) system.

22. The system of claim 20, comprising a coarse wavelength division multiplex (CWDM) system.

23. The system of claim 20, comprising at least one of a wavelength multiplexer, a wavelength demultiplexer, an add/drop multiplexer, an optical circulator, an optical amplifier, a wavelength filter, a fiber optic coupler, and a wavelength splitter.

* * * * *